United States Patent
Albrecht

(10) Patent No.: US 10,931,549 B2
(45) Date of Patent: Feb. 23, 2021

(54) COMMUNICATION DEVICE OF AN INDUSTRIAL AUTOMATION SYSTEM AND METHOD FOR CONFIGURATING THE COMMUNICATION DEVICE

(71) Applicant: Siemens Aktiengesellschaft, Munich (DE)

(72) Inventor: Harald Albrecht, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 299 days.

(21) Appl. No.: 15/044,906

(22) Filed: Feb. 16, 2016

(65) Prior Publication Data
US 2016/0241511 A1    Aug. 18, 2016

(30) Foreign Application Priority Data
Feb. 18, 2015  (EP) ..................... 15155518

(51) Int. Cl.
*H04L 12/911*    (2013.01)
*H04L 29/12*    (2006.01)
(Continued)

(52) U.S. Cl.
CPC .......... *H04L 43/08* (2013.01); *G05B 19/4185* (2013.01); *H04L 61/1511* (2013.01);
(Continued)

(58) Field of Classification Search
CPC ..... H04L 29/1232; H04L 43/08; H04L 61/20; H04L 61/305; H04L 61/1511;
(Continued)

(56) References Cited

U.S. PATENT DOCUMENTS

2007/0160051 A1* 7/2007 Huang ............... H04L 29/1232
370/392
2008/0186202 A1    8/2008 Vaswani et al.
(Continued)

FOREIGN PATENT DOCUMENTS

CN        101984636        3/2011
CN        103167058        6/2013
(Continued)

OTHER PUBLICATIONS

S. Park et al., "DNS Configuration in IPv6: Approaches, Analysis and Deployment Scenarios", 2013, IEEE Internet Computing; "vol. 17, Issue: 4, Jul.-Aug. 2013", http://ieeexplore.ieee.org/document/6243127/.*

(Continued)

*Primary Examiner* — Ruolei Zong
(74) *Attorney, Agent, or Firm* — Cozen O'Connor

(57) ABSTRACT

A communication device of an industrial automation system and method for configuring the communication device, wherein a communication network address assigned to the communication device is independently generated from at least one prefix communicated via router advertisement messages by at least one router assigned within a subnetwork and from a device-specific interface identifier, where the communication device interrogates at at least one server of a name service system, in accordance with a name resolution protocol, which communication network addresses are assigned to its communication device name, the communication network addresses interrogated at the at least one server of the name service system are checked with regard to correspondence to the prefix, and where the communication device assigns to itself only those communication network addresses interrogated at the server of the (Continued)

name service system which have a correspondence to the prefix communicated by the router.

14 Claims, 5 Drawing Sheets

(51) Int. Cl.
*H04L 12/26* (2006.01)
*G05B 19/418* (2006.01)

(52) U.S. Cl.
CPC ...... *H04L 61/2092* (2013.01); *H04L 61/6059* (2013.01); *H04L 61/2038* (2013.01); *Y02P 90/02* (2015.11)

(58) Field of Classification Search
CPC ............. H04L 61/2007; H04L 61/2015; H04L 61/2038; H04L 61/2092; H04L 61/6059; G05B 19/4185; Y02P 90/18
USPC ........................................................ 709/226
See application file for complete search history.

(56) References Cited

U.S. PATENT DOCUMENTS

| | | | | |
|---|---|---|---|---|
| 2008/0310323 | A1* | 12/2008 | Shirota | H04L 29/12056 370/254 |
| 2009/0177762 | A1* | 7/2009 | Shiraiwa | H04L 29/1232 709/220 |
| 2009/0248841 | A1 | 10/2009 | Tjandra et al. | |
| 2010/0023617 | A1* | 1/2010 | Tremaine | H04L 29/12264 709/224 |
| 2013/0046899 | A1* | 2/2013 | Harrington | H04L 61/6086 709/230 |
| 2015/0312213 | A1 | 10/2015 | Albrecht | |

FOREIGN PATENT DOCUMENTS

| | | |
|---|---|---|
| CN | 103220374 | 7/2013 |
| EP | 2 940 972 | 11/2015 |
| EP | 2 975 477 | 1/2016 |
| WO | WO 2007/144364 | 12/2007 |

OTHER PUBLICATIONS

S. Thomson et al., "IPv6 Stateless Address Autoconfiguration", 1998, IETF Network Working Group, Request for Comments: 2462, https://tools.ietf.org/pdf/rfc2462.pdf.*

J. Jeong, "IPv6 Host Configuration of DNS Server Information Approaches", 2006, IETF Network Working Group, Request for Comments: 4339, https://www.ietf.org/rfc/rfc4339.txt.*

Jeong J. et al.: "IPv6 Router Advertisement Options for DNS Configuration"; rfc6106.txt; Internet Engineering Task Force; IETF; Standard Internet Society (ISOC) 4; Rue des Falaisis CH-1205 Geneva; Switzerland; pp. 1-19; XP015075838;; 2010.

Park et al.: "DNS Configuration in IPv6; Approaches, Analysis and Deployment Scenarios"; IEEE Internet Computing; IEEE Service Center New York; Institute of Electrical and Electronics Engineers; US; Bd. 17; No. 4; pp. 48-56; XP011516336; ISSN 1089-7801; DOI: 10.1109/MIC.2012.96;; 2013.

Narten T. et al.:Neighbor Discovery for IP version 6 (IPv6); RFC: 4861; XP055128736; Gefunden im Internet: URL:http://tools.ietf.org/pdf/rfc4861.pdf; 2007.

Office Action dated Jul. 4, 2018 issued in the corresponding Chinese Patent Application No. 201610090119.1.

* cited by examiner

COMMUNICATION DEVICE OF AN INDUSTRIAL AUTOMATION SYSTEM AND METHOD FOR CONFIGURATING THE COMMUNICATION DEVICE

BACKGROUND OF THE INVENTION

1. Field of the Invention

The present invention relates to industrial automation systems and, more particularly, to a communication device of an industrial automation system and method for configuring the communication device.

2. Description of the Related Art

An industrial automation system usually comprises a multiplicity of automation devices internetworked via an industrial communication network and serves to control or regulate installations, machines and/or devices in the context of manufacturing automation or process automation. On account of time-critical boundary conditions in technical systems automated via industrial automation systems, real-time communication protocols, such as Profinet, Profibus or real-time Ethernet, are predominantly used for communication between automation devices in industrial communication networks.

Interruptions of communication connections between computer units of an industrial automation system or automation devices can lead to undesired or unnecessary repetition of a communication of a service request. This causes an additional burden in terms of the utilization of communication connections of the industrial automation system, which can lead to further system disturbances or faults. In industrial automation systems, a particular problem regularly results from message traffic with comparatively many, but relatively short messages, as a result of which the above problems are intensified.

On account of use for often extremely different applications, problems can arise in Ethernet-based communication networks, for example, if network resources for a communication of short data frames with real-time requirements are taken up in competition for a communication of data frames with a large payload data content. This can lead to a delayed communication of the data frames with real-time requirements or even to a loss of individual data frames of this type.

WO 2007/144364 A1 describes a method for networking an automated installation that comprises at least one cell with a subnetwork. The subnetwork is linked via a router to a further subnetwork of the automated installation. A multicast group extending over both subnetworks is provided for networking the automated installation. A communication network address of a communication network interface of an assembly is detected via the multicast group. Here, the assembly joined the multicast group beforehand via the communication network address, and the communication network interface was connected to the subnetwork beforehand. Via the communication network address, a name is allocated to the communication network interface of the assembly. A further step involves determining a further communication network address of the communication network interface of the assembly, which has at least part of a numerical representation of the name.

European patent application number 14166376.5 relates to a method for providing a name service within an industrial communication system, where IPv6 prefixes are distributed by routers via messages with router advertisements in respectively subordinate subnetworks. The router advertisements comprise a topological or hierarchical name component of the respective router, where the topological or hierarchical name component is assigned to a spatial or hierarchical arrangement of the respective router. Router advertisements with name information from superordinate subnetworks are received by routers assigned to subordinate subnetworks and are supplemented by a topological or hierarchical name component assigned to the respective router and are distributed within the respective subordinate subnetwork. Communication terminals, i.e., communication devices without routing functions, independently generate their device names from topological or hierarchical name components and a name component that is unique within their respective subnetwork. This enables simple start-up of series production machines because it is necessary to select unique names only at the machine level on account of the automatic completion as mentioned above.

European patent application number 14177262.4 describes a method for registering device names from an industrial automation system in a communication network name service. Here, a rule base is used to define a device specifically for which communication devices of the industrial automation system a registration of their respective device name in the communication network name service is permissible or necessary. By means of device-side decentralized name service agents, communication network addresses of communication devices are reported to a central name service agent of the industrial automation system. In the case of a name-address assignment to be registered, the central name service agent communicates a registration request comprising the name-address assignment to the communication network name service. Within the industrial automation system, only the central name service agent can communicate registration requests for processing to the communication network name service.

European patent application number 14184781.4 discloses a method for providing information about communication device names within an industrial automation system. In the event of an allocation or change of a device name of a communication device, a datagram with an update request for the assignment of its communication network address to the changed or allocated device name is distributed in particular to selected communication devices. The selected communication devices generate or change, in response to the update request, in each case a data record assigned to the communication device having the changed or allocated device name in their respective database. Here, the data record comprises the assignment of the communication network address to the device name.

European patent application number 14200562.8 describes a method for determining communication device addresses within a communication network of an industrial automation system. Selected communication devices of the industrial automation system are respectively assigned a storage unit which temporarily stores in each case at least part of a name service information provided by a communication network name service. A set-up of a connection from a first selected communication device to a second communication device is started in the case of an application or function of the industrial automation system that is distributed to at least the first and second communication devices, based on the name service information stored in the storage unit assigned to the first communication device. In the event of a failed attempt to set up a connection, the application or function initiates at least partial updating of the temporarily stored name service information.

Within industrial automation systems with series production machines which each comprise a plurality of machines of identical type within a subnetwork, a static allocation of communication network addresses is complex and susceptible to errors. In particular, a dedicated communication network address is usually required for each individual machine of a series production machine. Therefore, an independent address configuration, such as stateless address autoconfiguration (SLAAC), is extremely advantageous for automation devices. In the case of an independent address configuration, automation devices can be reliably addressed via their logical device names that comprise, for example, indications about technical functions or spatial or organizational assignments. In IPv6 communication networks, in particular, in the case of use of name services provided by a domain name system (DNS) with an update function (dynamic update) and communication network addresses generated independently by communication devices, after a device exchange new or updated device name-address assignments have to be registered by the respective name service.

SUMMARY OF THE INVENTION

It is an object of the present invention to provide communication devices and a method for configuring the communication devices within an industrial automation system which, after a device exchange, enables fast and reliable production of connectivity for a replacement communication device.

This and other objects and advantages are achieved in accordance with the invention by a communication device of an industrial automation system and method for configuring the communication device. Here, the communication device independently generates a communication network address assigned to the communication device from at least one prefix communicated via router advertisement messages by at least one router assigned within the subnetwork of the communication device and from a device-specific interface identifier. The communication device interrogates at at least ope server of a name service system, in accordance with a name resolution protocol, which communication network addresses are assigned to its communication device name. The prefix communicated via the router advertisement messages can be an IPv6 prefix, for example, where the communication device generates its assigned communication network address preferably in accordance with stateless address autoconfiguration. Furthermore, the communication device can, for example, comprise an automation device or can be integrated into an automation device.

In accordance with the invention, the communication device checks the communication network addresses interrogated at the server of the name service system with regard to correspondence to the prefix communicated by the router. Accordingly, the communication device assigns to itself only those communication network addresses interrogated at the server of the name service system which have a correspondence to the prefix communicated by the router. In this way, a new communication device, after a device exchange, can be addressed reliably and rapidly even under communication network addresses previously used for an exchanged communication device, particularly if the communication network addresses are still assigned to a logical communication device name of the new communication device in a name service system. Furthermore, a device exchange, via the above prefix checking, can be reliably differentiated from a device relocation, in the case of which, a further use of previously used communication network addresses is usually not desired.

The communication device can be, for example, a replacement communication device for an exchanged communication device, where the communication network addresses interrogated at the server of the name service system by the replacement communication device were previously assigned to the exchanged communication device. In the context of a device exchange, the communication device can advantageously interrogate at the server of the name service system which communication network addresses are assigned to its communication device name.

In accordance with one preferred embodiment of the method of the invention, the communication device determines, for the communication network addresses interrogated at the server of the name service system, a validity period (e.g., Time to Live (TTL), defined in the name service system, of an assignment between its communication device name and the respective communication network address. The communication device independently cancels its assignment to the respective communication network address after the determined validity period has elapsed. Preferably, the communication device independently cancels its assignment to the respective communication network address only after a multiple of the determined validity period has elapsed.

The server of the name service system can be, for example, a domain name system server that provides the name service to DNS clients in accordance with a DNS protocol.

In accordance with a further advantageous embodiment of the present invention, the communication device interrogates, at a primary and/or secondary DNS server, which communication network addresses are assigned to its communication device name. In many cases, a secondary DNS server registers name-address assignments somewhat later than a primary DNS server and cancels them correspondingly later. As a result, an interrogation at a secondary DNS server can advantageously still enable a determination of name-address assignments that have already been erased on the primary DNS server. Consequently, an interrogation at a secondary DNS server enables a determination going back further in time of communication network addresses assigned to an exchanged communication device that are possibly still stored in DNS caches of other communication devices and are used accordingly.

In accordance with one preferred embodiment of the present invention, the communication device comprises a DNS monitor and/or DNS client, where the communication device interrogates, via the DNS monitor and/or DNS client, which communication network addresses are assigned to its communication device name. Preferably, the communication device comprises a client for dynamic DNS, by which it requests storage of the assignment of its communication device name to an independently generated communication network address in the name service system. Advantageously, a data record comprising the assignment is created in the name service system in the event of a successful request of the storage of the assignment of the communication device name to the respective communication network address. By way of example, the communication network address can be an IPv6 address, and the data record (RR) can be an AAAA resource record which is erased from the name service system after its defined validity period has elapsed.

Advantageously, the communication device carries out a uniqueness check at least within its subnetwork before an independent assignment of communication device addresses, and the communication device assigns to itself only unique communication device addresses. Here, the communication device performs the uniqueness check preferably in accordance with the neighbor discovery protocol (DAD) or Internet Control Message Protocol for Internet Protocol Version 6 (ICMPv6).

The communication device in accordance with the invention for an industrial automation system is configured to implement the method in accordance with previously disclosed embodiments and comprises at least one transmitting and receiving unit (transmitter/receiver), and at least one control unit for coordinating access to a communication medium. Moreover, a configuration unit (configurator) is provided for independently generating a communication network address assigned to the communication device from at least one prefix communicated via router advertisement messages and from a device-specific interface identifier. Furthermore, the communication device comprises a monitoring unit (monitor) for interrogating at at least one server of a name service system, in accordance with a name resolution protocol, where the communication network addresses are assigned to a communication device name of the communication device.

In accordance with the invention, the communication device is configured to check the communication network addresses interrogated at the server of the name service system for correspondence to the communicated prefix. Furthermore, the communication device is configured to assign to itself only those communication network addresses interrogated at the server of the name service system that have a correspondence to the prefix communicated by the router.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is described in greater detail below on the basis of an exemplary embodiment with reference to the drawing, in which.

DETAILED DESCRIPTION OF THE EXEMPLARY EMBODIMENTS

Figure 1:
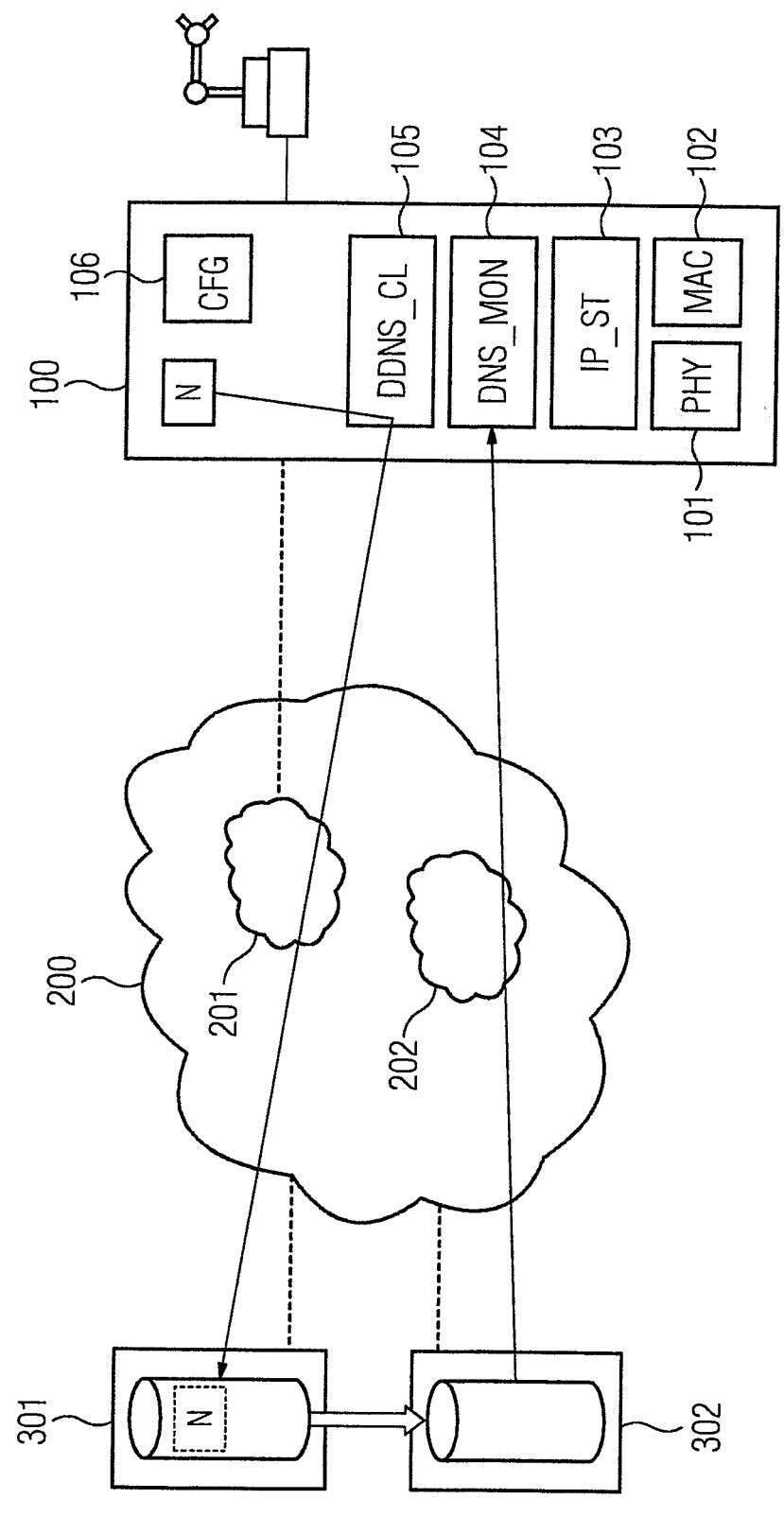
FIG. 1 shows an industrial automation system comprising two subnetworks with an automation device, a primary DNS server and a secondary DNS server in the event of a start-up of the automation device in accordance with the invention.

The industrial automation system illustrated in FIG. 1 comprises, in accordance with the present exemplary embodiment, at least one exemplary automation device 100, a primary server 301 and a secondary server 302 of a domain name system (DNS). The automation device 100 and the DNS servers 301, 302 are connected to one another via an industrial communication network 200 comprising a first subnetwork 201 and a second subnetwork 202.

The automation device 100 can be, for example, a programmable logic controller (PLC) or a field device and comprises a communication device in the present exemplary embodiment. The communication device has a transmitting and receiving unit (transmitter/receiver) 101 realized by a PHY functional unit, a control unit (controller) 102 realized by an MAC functional unit and serving for coordinating access to a communication medium, and a transport and switching functional unit (transmitter/switcher) 103 for processing a TCP/IP protocol stack. The transport and switching functional unit (transmitter/switcher) 103 accesses, via a communication network adapter driver, the transmitting and receiving unit (transmitter/receiver) 101 and the control unit (controller) 102 for coordinating a communication medium access. In this way, the transport and switching functional unit (transmitter/switcher) 103 provides a connection-oriented TCP/IP transport service for at least one control program running on the automation device 100.

Furthermore, the communication device of the automation device 100 comprises a configuration unit (configurator) 106 for independently generating a communication network address assigned to the communication device. In the present exemplary embodiment, the communication network address is generated in accordance with stateless address autoconfiguration (SLAAC) from at least one IPv6 prefix communicated via router advertisement messages or router advertisement and from a device-specific interface identifier. The interface identifier can be derived from a MAC address, for example. Furthermore, before an independent assignment of communication device addresses, the configuration unit (configurator) 106 performs a uniqueness check within the respective subnetwork 201, 202 in accordance with the neighbor discovery protocol, with the result that the communication device assigns to itself only unique communication device addresses.

In addition, the communication device has a monitoring unit (monitor) 104 comprising a DNS client, via which monitoring unit the communication device interrogates at the DNS servers 301, 302, in accordance with the DNS protocol, which communication network addresses are assigned to its communication device name. Based on such an interrogation, the monitoring unit (monitor) 104 checks the communication network addresses interrogated at the primary DNS server 301 and/or secondary DNS server 302 with regard to correspondence to the IPv6 prefix communicated by means of router advertisement. Proceeding from this check, the communication device assigns to itself only those communication network addresses interrogated at the DNS servers 301, 302 which have correspondence to the IPv6 prefix communicated via the router advertisement. For this purpose, the monitoring unit (monitor) 104 communicates a corresponding checking result to the configuration unit (configurator) 106, which then implements an assignment of communication network addresses to be accepted in the context of an address autoconfiguration.

Furthermore, the communication device of the automation device 100 comprises a DDNS client 105 (dynamic DNS), via which the communication device requests storage of the assignment of its communication device name to an independently generated communication network address in the domain name system. In the event of a successful request of storage of the assignment of the communication device name to the respective communication network address, an AAAA resource record comprising the assignment is created for IPv6 addresses in the domain name system, and is erased from the domain name system after its defined validity period has elapsed.

In accordance with FIG. 1, upon an initial start-up, the automation device 100 is connected to the first subnetwork 201 and acquires a corresponding subnetwork assignment. Upon an initial start-up, in the DNS servers 301, 302 for the automation device 100 either no communication network addresses at all are stored or only a communication network address N just registered is stored. A replication between a primary DNS server 301 and a secondary DNS server 302 usually lasts for a few minutes, such that the communication network address N of the automation device 100 can be interrogated correspondingly later at the secondary DNS server 302.

Figure 2:
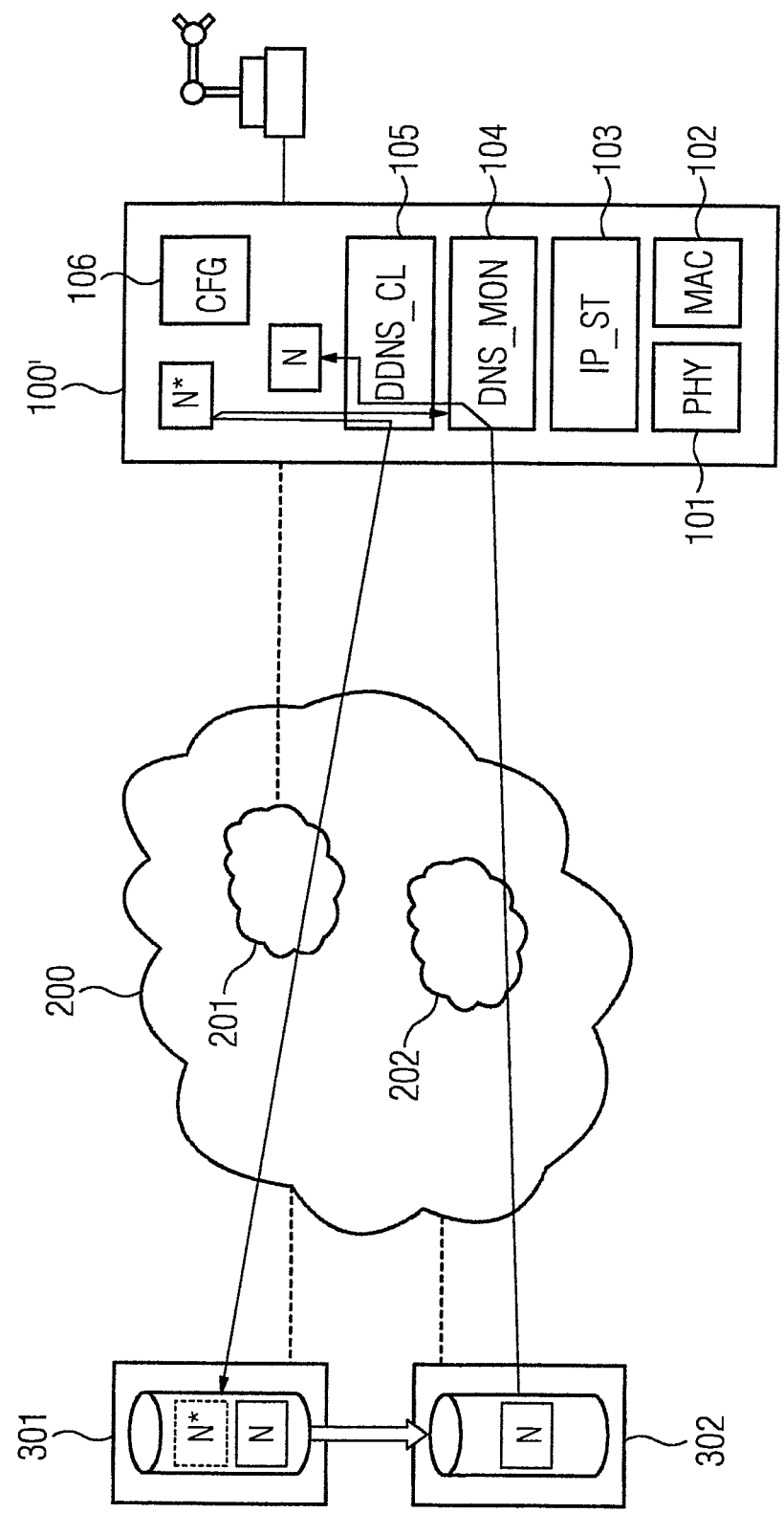
FIG. 2 shows the automation system of FIG. 1 in the event of an exchange of the automation device.

In the event of the automation device 100 being exchanged for a replacement automation device 100', as indicated in FIG. 2, the replacement automation device interrogates at the DNS servers 301, 302 the communication network address N which was previously assigned to the exchanged automation device 100. Generally, replacement automation devices in accordance with the present exemplary embodiment, in the context of a device exchange, interrogate at the DNS servers 301, 302 which communication network addresses are assigned to their respective communication device name, because communication device names or logical device names are taken over from the exchanged automation device without being changed.

The replacement automation device 100' generates its communication network address N* analogously to previous embodiments by SLAAC itself. The replacement automation device 100' has a different device hardware than the exchanged automation device 100. As a result, the communication network address N* of the replacement automation device 100' and the communication network address N of the exchanged automation device 100 are not identical. This is essential particularly in the case of multiply used series production machines having a configuration of identical type, so that an individual device identification remains possible.

In the event of a fast device exchange, often the communication network address N of the exchanged automation device 100 is still stored in the DNS servers 301, 302 when the replacement automation device 100' is put into operation. Obsolete address information is still stored for a relatively long time particularly in the secondary DNS server 302. On account of this, other automation or communication devices, under certain circumstances, cannot recognize a device exchange rapidly enough because new address information must be initially distributed by the domain name system.

The replacement automation device 100' is configured identically to the exchanged automation device 100. Consequently, address information that is assigned to the exchanged automation device 100 and is obsolete, in principle, can also be used for communication with the replacement automation device 100'. This is because the communication network address N of the exchanged automation device 100 is identified by the replacement automation device 100' via its monitoring unit (monitor) 104. In this way, the replacement automation device 100' can assign to itself the communication network address N of the exchanged automation device 100 in parallel with its self-generated communication network address N*. Consequently, other automation or communication devices can reach the replacement automation device 100' for a transition time also with address information that is assigned to the exchanged automation device 100 and is obsolete, in principle.

Figure 3:
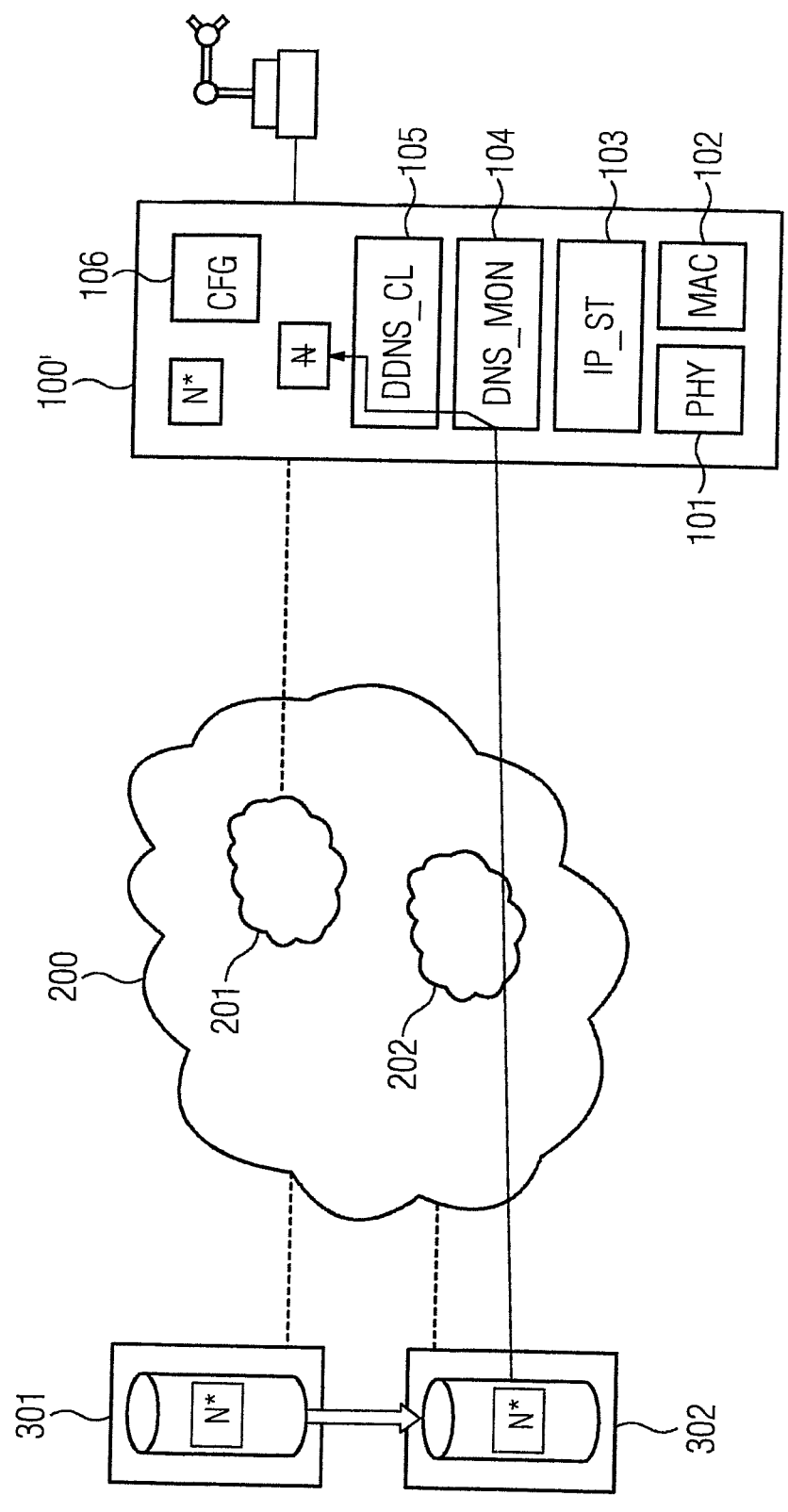
FIG. 3 shows the automation system of FIG. 1 in the event of an address correction for the automation device.

FIG. 3 illustrates a scenario for address correction in which obsolete address information is firstly removed from the DNS servers 301, 302 after a predefined validity interval has elapsed, with the result that the information is no longer distributed further to DNS clients. Furthermore, the communication device of the replacement automation device 100' determines a validity period (defined in the DNS servers 301, 302) of an assignment between its communication device name and the communication network address N of the exchanged automation device 100. After the determined validity period has elapsed, the configuration unit (configurator) 106 of the replacement automation device 100' independently cancels the assignment of the communication network address N of the exchanged automation device 100. Preferably, the communication device independently cancels the assignment of affected communication network addresses only after a multiple of the determined validity period has elapsed. At this point in time, a data record having a corresponding address assignment is then no longer stored in any DNS server. Advantageously, the replacement automation device 100', before the cancellation of the assignment of the communication network address N of the exchanged automation device 100, terminates all communication connections set up by other automation or communication devices using obsolete address information. Automation or communication devices affected by a termination of the communication connections can subsequently set up new communication connections to the replacement automation device 100' using current address information provided by the DNS servers 301, 302.

Figure 4:
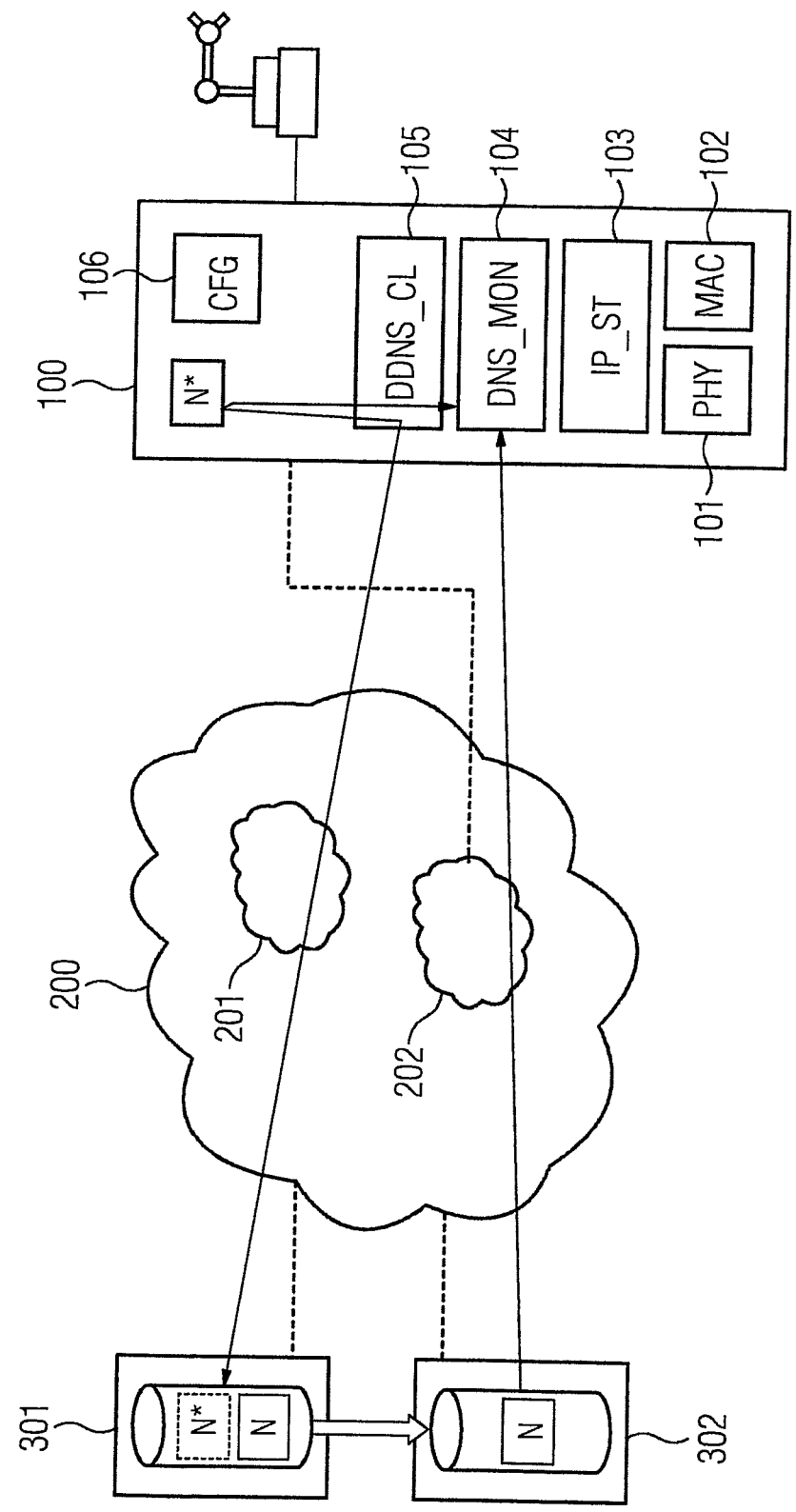
FIG. 4 shows the automation system of FIG. 1 in the event of a relocation of the automation device into a different subnetwork.

With reference to FIG. 4, in the event of a relocation, the automation device 100 is connected to the second subnetwork 202 and thus acquires a changed subnetwork or IPv6 prefix assignment. In the event of such a relocation, further use of previously assigned address information is undesired. The communication device of the automation device 100 checks communication network addresses interrogated at the DNS servers 301, 302 with regard to correspondence to the current IPv6 prefix communicated via router advertisement. Consequently, a relocation can be differentiated from a device exchange. Accordingly, in the event of a relocation or a negative checking result, the communication device refrains from an assignment of interrogated communication network addresses with a deviating IPv6 prefix.

Figure 5:
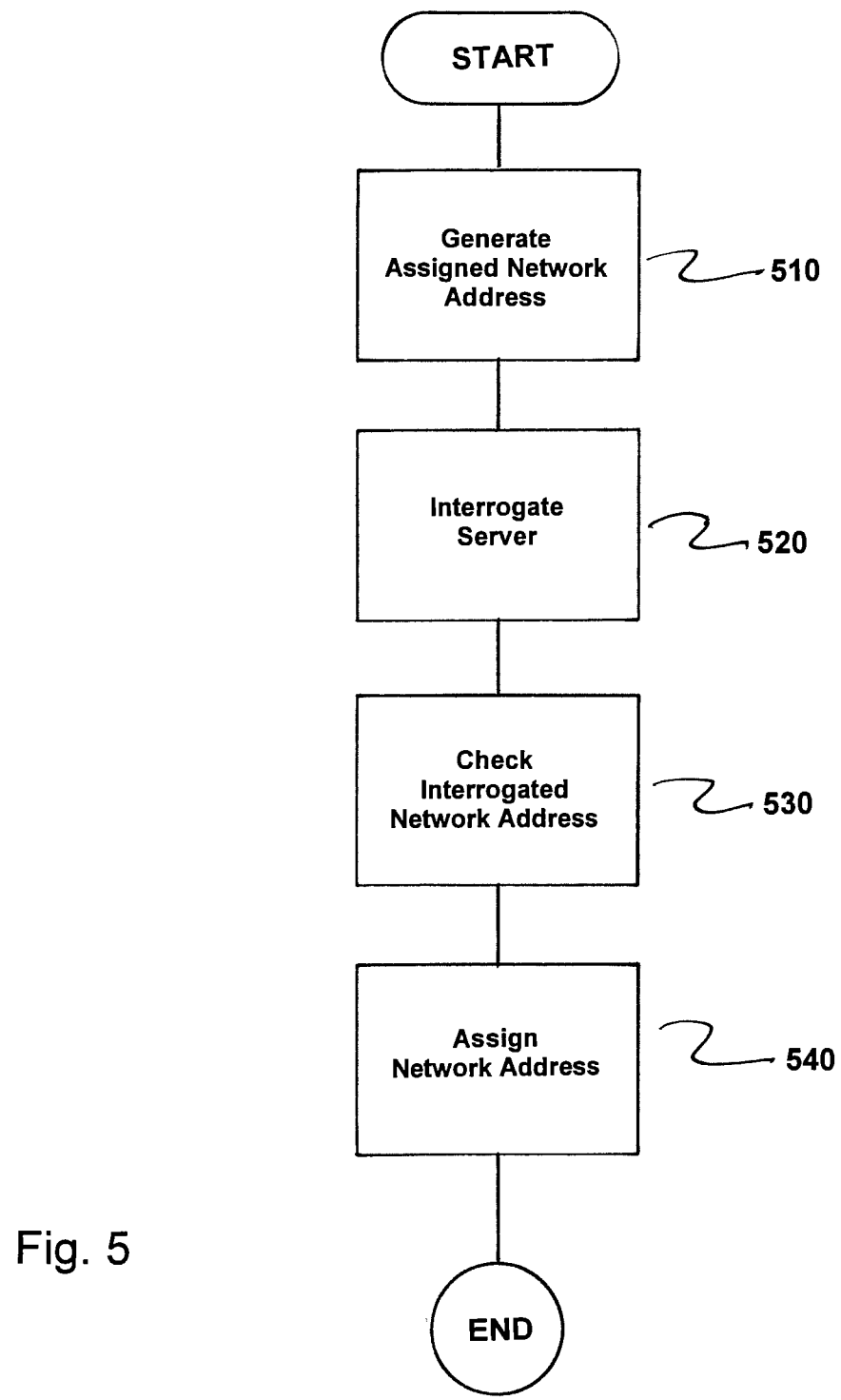
FIG. 5 is a flowchart of the method in accordance with the invention.

FIG. 5 is a flowchart of a method for configuring a communication device of an industrial automation system. The method comprises generating, by the communication device independently, a communication network address assigned to the communication device from at least one prefix communicated via router advertisement messages by at least one router assigned within the subnetwork of the communication device and from a device-specific interface identifier, as indicated in step 510.

Next, the communication device interrogates at at least one server of a name service system, in accordance with a name resolution protocol, which communication network addresses are assigned to its communication device name, as indicated in step 520.

The communication device then checks the communication network addresses interrogated at the at least one server of the name service system to determine correspondence to the prefix communicated by the at least one router, as indicated in step 530. The communication device now assigns to itself only those communication network addresses interrogated at the at least one server of the name service system which have a correspondence to the prefix communicated by the router, as indicated in step 540.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for configuring a communication device of an industrial automation system, the communication device being a replacement communication device for an exchanged communication device, comprising:
   generating, by the communication device independently, a communication network address assigned to the communication device of the industrial automation system from at least one prefix communicated via router advertisement messages by at least one router assigned within the subnetwork of said communication device of the industrial automation system and from a device-specific interface identifier;
   interrogating, by the communication device of the industrial automation system within a context of a device exchange, at at least one server of a name service system, in accordance with a name resolution protocol, which communication network addresses are assigned to its communication device name, the communication network addresses interrogated at the at least one server being previously assigned to the exchanged communication device;
   checking, by the communication device of the industrial automation system, the communication network addresses interrogated at the at least one server of the name service system within the context of the device exchange to determine correspondence to the prefix communicated by the at least one router; and
   assigning, by the communication device of the industrial automation system, only those communication network addresses interrogated at the at least one server of the name service system which have a correspondence to the prefix communicated by the router, said communication addresses being assigned to the communication device of the industrial automation system;
   wherein the server of the name service system comprises a domain name system (DNS) server which provides a name service to DNS clients in accordance with a DNS protocol;
   wherein the communication device of the industrial automation system comprises at least one of (i) a DNS monitor and (ii) a DNS client; and
   wherein the communication device of the industrial automation system interrogates via at least one of (i) the DNS monitor and (ii) the DNS client which communication network addresses are assigned to its communication device name.

2. The method as claimed in claim 1, wherein the communication device of the industrial automation system determines, for the communication network addresses interrogated at the at least one server of the name service system, a validity period, defined in the name service system, of an assignment between its communication device name and the respective communication network address; and wherein the communication device of the industrial automation system independently cancels its assignment of the respective communication network address after the determined validity period has elapsed.

3. The method as claimed in claim 2, wherein the communication device of the industrial automation system independently cancels its assignment of the respective communication network address only after a multiple of the determined validity period has elapsed.

4. The method as claimed in claim 1, wherein the communication device of the industrial automation system interrogates at at least one of (i) a primary DNS server and (ii) a secondary DNS server which communication network addresses are assigned to its communication device name.

5. The method as claimed in claim 1, wherein the communication device of the industrial automation system comprises a client for dynamic DNS, via which said communication device of the industrial automation system requests storage of the assignment of its communication device name to an independently generated communication network address in the name service system.

6. The method as claimed in claim 5, wherein a data record comprising the assignment is created in the name service system in an event of a successful request of the storage of the assignment of the communication device name to the respective communication network address.

7. The method as claimed in claim 6, wherein the communication network address is an IPv6 address; and wherein a data record is an AAAA resource record which is erased from the name service system after its defined validity period has elapsed.

8. The method as claimed in claim 1, wherein a prefix communicated via router advertisement messages is an IPv6 prefix; and wherein the communication device meets its assigned communication network address according to stateless address autoconfiguration.

9. The method as claimed in claim 1, wherein the communication device of the industrial automation system performs a uniqueness check at least within its subnetwork before an independent assignment of communication device addresses; and wherein the communication device of the industrial automation system assigns to itself only unique communication device addresses.

10. The method as claimed in claim 9, wherein the communication device of the industrial automation system performs the uniqueness check in accordance with a neighbor discovery protocol.

11. The method as claimed in claim 1, wherein the communication network addresses interrogated at the at least one server of the name service system by the replacement communication device are previously assigned to the exchanged communication device.

12. The method as claimed in claim 1, wherein the communication device of the industrial automation system interrogates within the context of the device exchange at the at least one server of the name service system which communication network addresses are assigned to its communication device name.

13. The method as claimed in claim 1, wherein the communication device of the industrial automation system one of (i) comprises an automation device and (ii) is integrated into the automation device.

14. A communication device of an industrial automation system, comprising:
- at least one transmitter/receiver;
- at least one controller which coordinates access to a communication medium;
- a configurator for independently generating a communication network address assigned to the communication device of the industrial automation system from at least one prefix communicated via router advertisement messages and from a device-specific interface identifier;
- a monitor configured to interrogate, within a context of a device exchange, at at least one server of a name service system, in accordance with a name resolution protocol, which communication network addresses are assigned to a communication device name of the communication device of the industrial automation system, the communication network addresses interrogated at the at least one server being previously assigned to the exchanged communication device;
- wherein the communication device of the industrial automation system is configured to check, within the context of the device exchange, the communication network addresses interrogated at the at least one server of the name service system for correspondence to the communicated prefix;
- wherein the communication device of the industrial automation system is further configured to assign to itself only those communication network addresses interrogated at the at least one server of the name service system which have a correspondence to the prefix communicated by a router;
- wherein the server of the name service system comprises a domain name system (DNS) server which provides a name service to DNS clients in accordance with a DNS protocol;
- wherein the communication device of the industrial automation system comprises at least one of (i) a DNS monitor and (ii) a DNS client; and
- wherein the communication device of the industrial automation system interrogates via at least one of (i) the DNS monitor and (ii) the DNS client which communication network addresses are assigned to its communication device name.

* * * * *